L. B. HOIT.
Milking Stools.
No. 77,376.
Patented Apr. 28, 1868.
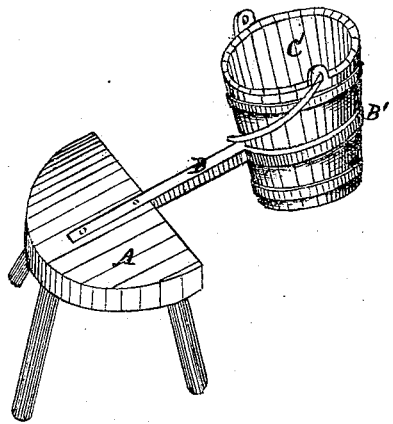
Witnesses
S. Ainsworth
Chas. F. Clausen
L. B. Hoit
Inventor,
D. R. Holloway & Co
his Attys.

United States Patent Office.

L. B. HOIT, OF CEDAR FALLS, IOWA.

Letters Patent No. 77,876, dated April 28, 1868.

IMPROVEMENT IN MILKING-STOOL AND PAIL-HOLDER.

The Schedule referred to in these Letters Patent and making part of the same.

TO ALL WHOM IT MAY CONCERN:

Be it known that I, L. B. HOIT, of Cedar Falls, in the county of Black Hawk, and State of Iowa, have invented a new and useful Improved Milking-Stool and Pail-Holder; and I do hereby declare that the following is a full, clear, and exact description of the same, reference being had to the annexed drawings, making part of this specification.

The subject of this improvement is a stool and pail-holder, for use in milking cows, to hold the pail near the bag of the cow, so that the milk shall not be lost by spraying, as is the case when the pail rests upon the ground, nor the pail be exposed to filth, nor the milker wearied by holding the pail on the knees.

In the annexed drawings, A is a stool, to which is attached an arm, B, with a circular frame, B', at the end to support the pail, C. The weight of the milker sitting on the stool counterbalances that of the milk-pail.

By the use of this simple article, milk is saved, and also preserved from filth, the bucket is out of the way of the cow's tail, and she cannot kick it over. At the same time much fatigue is saved to the milker.

What I claim as my invention, and desire to secure by Letters Patent, is—

As a new article of manufacture, a combined milking-stool and pail-holder, constructed substantially as described.

In testimony whereof, I have signed my name to this specification in the presence of two subscribing witnesses.

L. B. HOIT.

Witnesses:
WM. H. SESSIONS,
F. A. HOTCHKISS.